United States Patent

Elshout

[19]

[11] Patent Number: 6,001,151
[45] Date of Patent: Dec. 14, 1999

[54] FILTER ASSEMBLIES

[75] Inventor: Robin Dean Elshout, Fradley, United Kingdom

[73] Assignee: AAC Eurovent Limited, West Midlands, United Kingdom

[21] Appl. No.: 09/058,111

[22] Filed: Apr. 9, 1998

[30] Foreign Application Priority Data

Apr. 11, 1997 [GB] United Kingdom ................... 9707332

[51] Int. Cl.⁶ .................................................. B01D 53/04
[52] U.S. Cl. ................................ 95/25; 96/117.5; 96/416; 96/421
[58] Field of Search ................................ 96/414, 415, 416, 96/417, 421, FOR 170, 117.5; 95/25; 55/DIG. 26, DIG. 34, 483, DIG. 631

[56] References Cited

U.S. PATENT DOCUMENTS

| | | | |
|---|---|---|---|
| 2,716,338 | 8/1955 | Blinn | 96/416 |
| 3,635,001 | 1/1972 | Komroff et al. | 96/417 |
| 3,841,484 | 10/1974 | Domnick | 210/95 |
| 3,966,440 | 6/1976 | Roberts | 55/274 |
| 4,033,733 | 7/1977 | Nelson | 55/274 |
| 4,046,512 | 9/1977 | Kaczmarek et al. | 23/253 TP |
| 4,154,586 | 5/1979 | Jones et al. | 96/117.5 |
| 4,863,591 | 9/1989 | Dionne | 210/94 |
| 5,110,330 | 5/1992 | Loughran | 96/415 |
| 5,114,570 | 5/1992 | Nelson et al. | 210/94 |
| 5,505,753 | 4/1996 | Heysek | 96/416 |

FOREIGN PATENT DOCUMENTS

| | | | |
|---|---|---|---|
| 63-166412 | 7/1988 | Japan | 96/FOR 170 |
| 1-155137 | 6/1989 | Japan | 96/FOR 170 |
| 3-286489 | 12/1991 | Japan | 96/FOR 170 |

Primary Examiner—Duane S. Smith
Attorney, Agent, or Firm—Testa, Hurwitz & Thibeault, LLP

[57] ABSTRACT

A filter cell for use as all or as part of a filter panel includes an upper face 1 and a lower face 2. The upper face 1 and lower face 2 includes a set of parallel ribs 3 interconnected across one end by a further rib 4 orthogonal to the ribs 3. A mesh panel 5 is provided between each of the ribs 3 to define a flat surface through which air or gas can flow. The ribs on the upper face 1 cooperate with the ribs on the lower face 2 to define a plurality of open ended compartments spacer frame 6 which increase the size of the compartments by extending the ribbing 3 on the upper 1 and lower 2 faces are provided between upper face 1 and lower face 2. The upper face 1, spacer frames 6 and lower frame 2 are assembled by snap-fit using corresponding male 10 and female 11 lugs. A filter medium is inserted through the open ends into the compartments and a slide plate is used to close the ends.

29 Claims, 5 Drawing Sheets

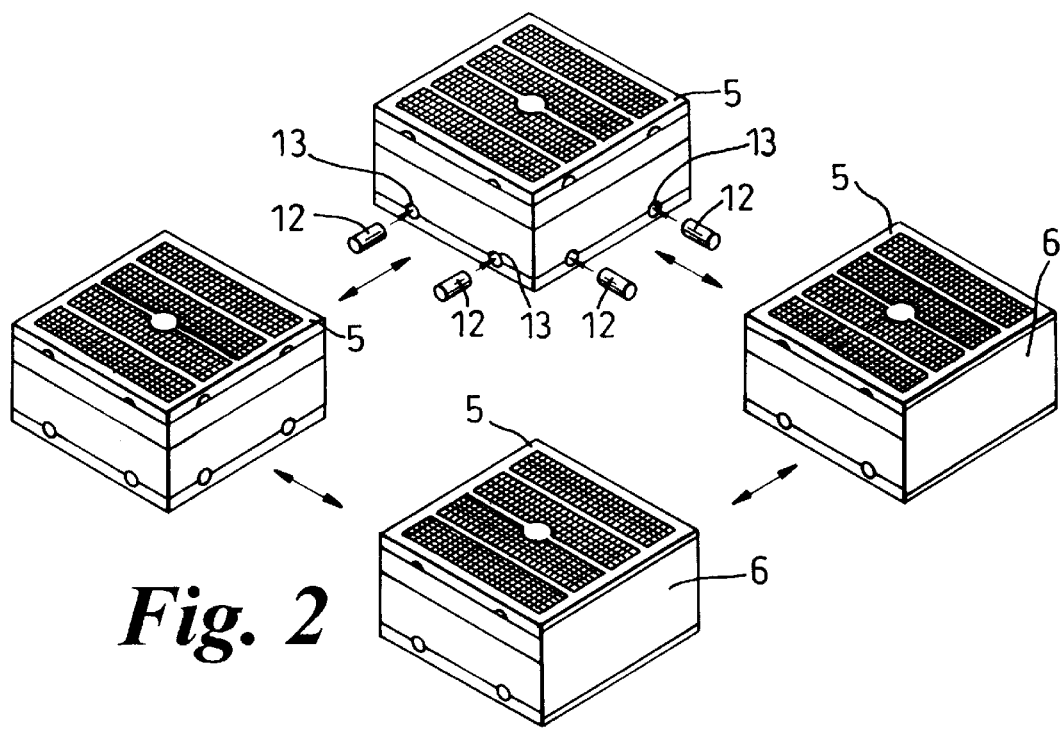
*Fig. 2*
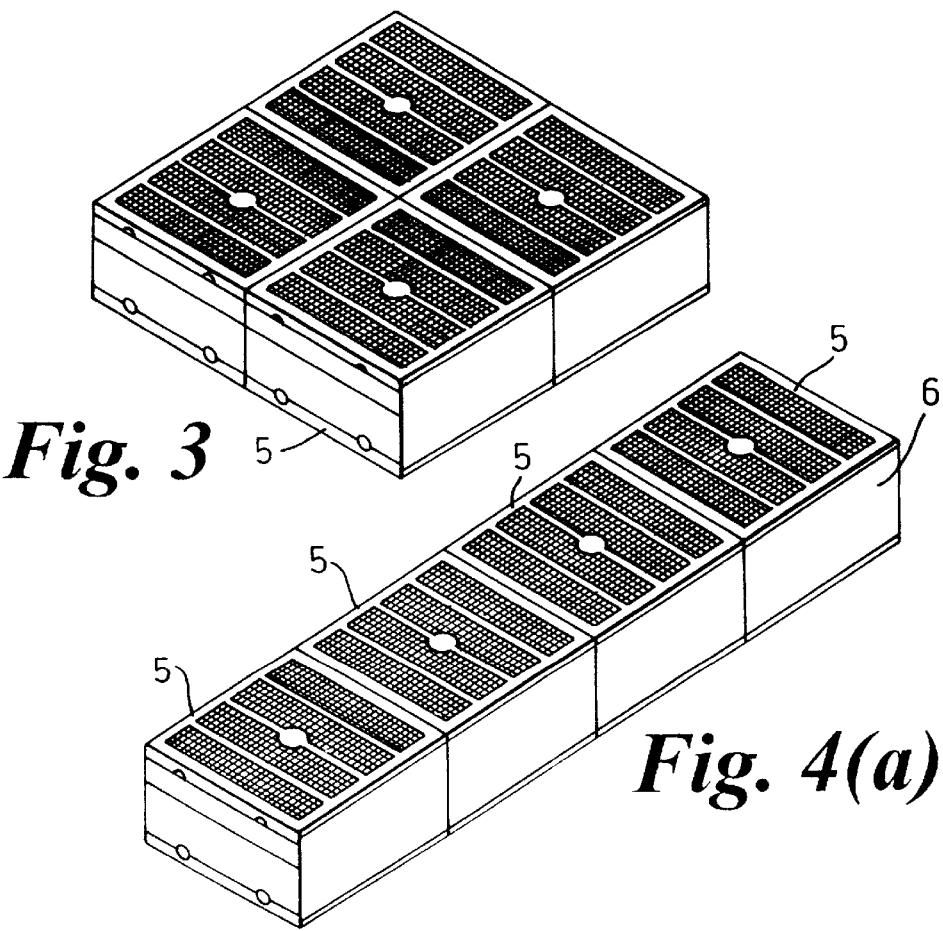
*Fig. 3*
*Fig. 4(a)*

FILTER ASSEMBLIES

FIELD OF THE INVENTION

This invention relates to filter units for air and/or gas purification, and in particular, relates to filter units of the kind in which air or gas is passed through a chemisorption type filtering media.

BACKGROUND OF THE INVENTION

The use of a chemisorption type filtering media to remove contaminants from air or gas is well known. Typically, the media is held within compartments in filter trays or panels which are mounted in a stack in a housing. For optimum filtering, it is desirable to provide as large a surface area of filtering media to the flow of air or gas as possible. It is known to achieve this by stacking the filter panels in a zigzag or concertina formation, so that one end of each of the panels contacts a respective end of the panel above whilst the other end of the panel contacts an end of the panel below. The flow of air or gas to be filtered is then orientated to flow from one end of the panels to the other (i.e. at a normal to the stack of panels). This provides a large exposed surface area in a relatively small space.

A typical housing comprises a box unit having first and second opposed open ends, and a removable front face. The filter panels can then be stacked in the housing with the ends of the panels locating on grooves or protrusion's in the housing so that each panel is slightly tilted relative to the housing and the panels together form a stack.

It is known to provide filter panels which are formed of a metal or opaque plastics material. The filter media is trapped between upper and lower mesh panels to allow a relatively free flow of air or gas through the filter media.

For maximum operational efficiency of the filter units, it is important that the chemisorption media is renewed before it becomes saturated. The condition of the filter media can be checked by removing it from the filter panels and performing a chemical analysis, but this is costly, messy and time consuming. The media may need to be sent away for specialist checking, which is disadvantageous.

A simple way of checking the condition of the filter media is to use chemisorption type media which changes color, for example, as it is oxidised. The color change produces a simple indication of filter media condition. Nevertheless, when used with prior art metal or opaque plastic filter panels, it is still necessary to dismantle the filter unit and panels in order to check the condition of the filter media.

SUMMARY OF THE INVENTION

In accordance with the present invention, a filter panel for use in combination with a filter unit comprises a housing adapted to support one or more panels within a flow of air or gas through said housing, in which at least a portion of said panel is made from an optically transparent material, and said panel is adapted to house a filter material which changes color depending on its condition.

This is advantageous in that the combination of a transparent portion of the filter panel with a filter medium which changes color in use allows the condition of the filter media to be checked without dismantling the filter panels. It also means it may be possible to check filter media condition without removing the filter panels from the filter housing.

Preferably the filter panel is made entirely of an optically transparent material. The material may be a plastic such as polycarbonate or high impact styrene. The panel may be formed by injection moulding.

Preferably, at least a portion of the filter media is a chemisorption material which is adapted to change color as it becomes saturated, for example such filter media may be impregnated activated alumina.

The advantage of providing a filter panel which is wholly transparent is that it offers an improved view of the filter media. It is particularly advantageous if it is possible to view the color change caused by contaminates as it processes throughout the filter media as this can provide a more accurate analysis than merely viewing a single point in the media.

More than one filter panel may be contained in the housing wherein at least one of the panels houses a filter media adapted to change color depending on its condition. The remaining panels contained in the housing may house a further type of filter media, which may or may not be adapted to change color depending on its condition, for example activated carbon.

Preferably the filter panels may each comprise one or more filter cells. The filter cells may be interlockable to allow an array of cells to be assembled into panels of varying sizes, i.e. 2×2, 3×2, 1×1, etc. This is advantageous in that it allows filter panels to be assembled which are similar in dimensions to standard filter panels for various applications, i.e., for use as after-market filter panels.

Each of said filter cells may comprise at least an upper perforated face and a lower perforated face supported in a spaced apart arrangement to define one or more compartments therebetween in which a filter media can be retained. The perforations allow air or fluid to flow through the filter panels. The upper and lower faces may define a mesh. The faces may be spaced apart by ribbing provided on one side of at least one of the faces integral with the mesh.

Preferably, ribbing may be provided on the upper face which is complementary to ribbing on the lower face to define a plurality of compartments when the upper and lower face are assembled together. This is advantageous in that the provision of a plurality of compartments helps to hold the filter media in position.

Preferably, the compartments of the filter cell may be open-ended to allow movement of filter media from one cell to another cell in a multicell filter panel. A slide strip may be provided which can be inserted across the open end between the upper and lower faces to close off the compartments. The slide strip may work in one or more grooves in the upper and/or lower faces. This allows the filter panels to be refilled.

A spacer frame may be provided which has a complementary shape to the ribbing on the upper and lower faces. It preferably comprises an end strip which forms an end wall of the filter cell, first and second parallel side strips which extend from said end strip to define the side walls of the filter cell, and one or more partition strips which extend from the end strip between the two side strips which act as baffles to define one or more cavities. The provision of a spacer frame allows the spacing between the upper and lower faces to be increased. By providing one or more spacer frames of a predetermined depth, or of a variable depth, the total depth of the filter cells, and hence volume of filter media which can be accommodated can be varied. The spacer frame can also be used with upper and lower faces having no ribbing. Using combinations of spacers and/or spacer frames of various widths, the filter panels can be assembled with any given depth within 1–2 mm.

The upper and lower faces, spacer frames and slide strip may each be at least partially transparent.

In accordance with a second aspect of the invention, a method of monitoring the condition of a filter media in a filter unit, including a housing adapted to support one or more filter panels disposed therein, comprises the steps of:

providing a filter panel having at least a first transparent portion which contains a filter media which is adapted to provide a visual indication of the condition of the filter media; and monitoring the condition of the filter media by viewing the media through the transparent portion of the filter panel.

The method may further comprise comparing the filter media to a predetermined color on a color swatch. The color swatch may be calibrated.

BRIEF DESCRIPTION OF THE DRAWINGS

There will now be described, by way of example only, an embodiment of the present invention as shown in the accompanying drawings in which:

FIG. 2 shows an exploded perspective view of a two-by-two filter panel composing four assembled filter cells;

FIG. 3 shows a perspective view of the filter panel of FIG. 2;

DETAILED DESCRIPTION OF THE INVENTION

Figure 1:
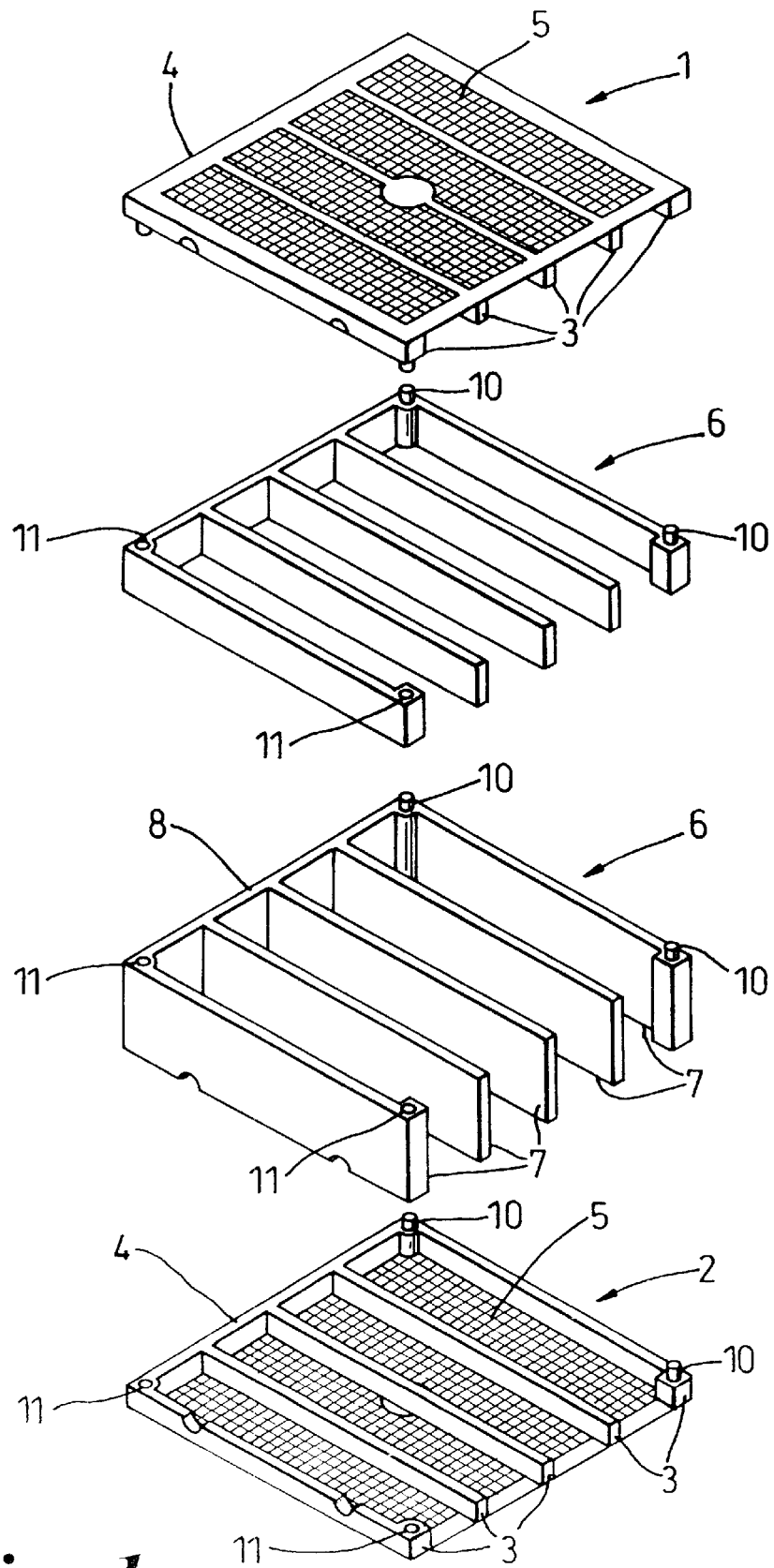
FIG. 1 shows an exploded perspective view of a single filter cell which may form a part of a filter panel in accordance with the present invention.

FIG. 1 shows an exploded perspective view of a filter cell which can form all or part of a filter panel in accordance with the present invention.

The filter cell comprises an upper face 1 and a lower face 2. As shown, the upper 1 and lower 2 faces are identical. Each face comprises a set of parallel ribs 3 interconnected across one end by a further rib 4 orthogonal to the set of parallel ribs 3. A mesh panel 5 is provided between each of the ribs 3 to define a substantially flat surface through which air or gas may flow relatively unimpeded. As shown, the parallel ribs 3 are equally spaced so that the ribs on the upper face 1 can cooperate with the ribs on the lower face 2 to define a plurality of open-ended compartments. Each compartment is defined, therefore, by an upper and lower mesh portion, and three sides defined by the ribs 3 on the upper and lower faces 1, 2.

In order to increase the size of the cavities, as well as provide an increased flexibility, one or more spacer frames 6 are provided. Each spacer frame 6 comprises a plurality of spaced parallel side strips 7 connected at one end to an end strip 8. When the filter cell is assembled, the spacer frame 6 effectively extends the ribbing 3 on the upper and/or lower faces 1, 2 to increase the spacing between the upper and lower meshes 5. The spacer frames 6 are made of plastic, and are transparent. The depth of the spacer frame 6 is tailored to match the depth requirements for the overall filter depth.

When the upper and lower faces 1, 2, and spacer frames 6, are assembled, it is possible to insert a filter media into the compartments through the open end face. To prevent the filter media from escaping, a slide plate can be provided (not shown) which fits across the open end in grooves (also not shown) in the upper and lower faces. The slide plate is transparent.

The upper and lower faces and the side plates are provided with male 10 and female 11 connecting lugs and holes which allow them to be assembled using a snap-fit. The various parts can also be glued together to increase strength.

A complete filter panel can be formed using just a single filter cell, or, as shown in FIGS. 2 to 4, by using a plurality of such cells.

FIG. 2 shows an exploded view of a filter panel made up from a two by two array of filter cells. As can be seen, the cells are connected using dowels 12 which fit within holes 13 in the sides of the filter cells.

The complete assembled filter panel is shown in FIG. 3. It will be noted that one or more dowels 12 may be used to join two or more cells together and a liberal application of jointing compound can be used to provide a solid and airtight fit between cells.

Figure 4B:
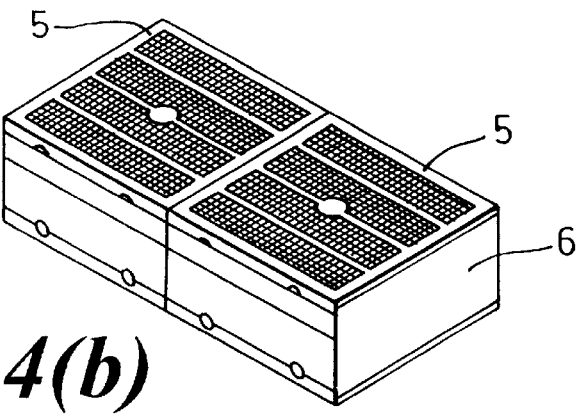
FIGS. 4(a) and (b) shows two alternative panel filter arrangements assembled from two and four filter cells respectively.

It will be readily understood that various arrangements of filter cells can be used to form a single filter panel. Two further examples using four and two cells respectively are shown in FIGS. 4(a) and 4(b).

Figure 5A:
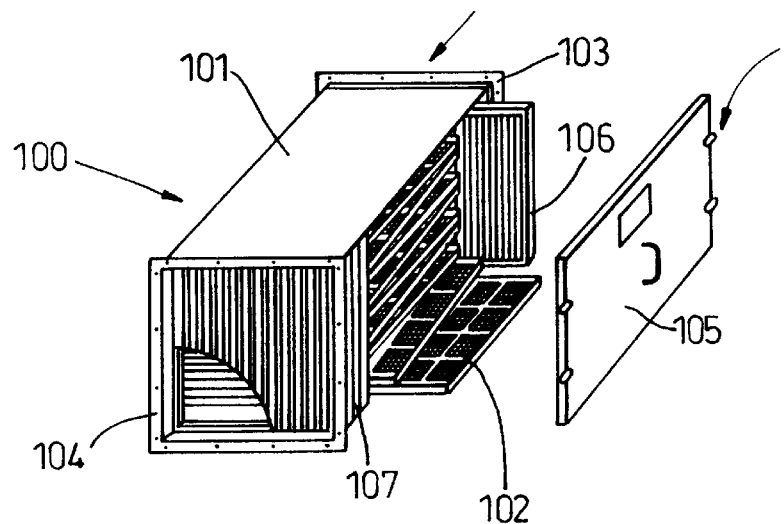
FIGS. 5(a) and 5(b) show the use of the panels in accordance with the invention in two different sized filter units.
Figure 5B:
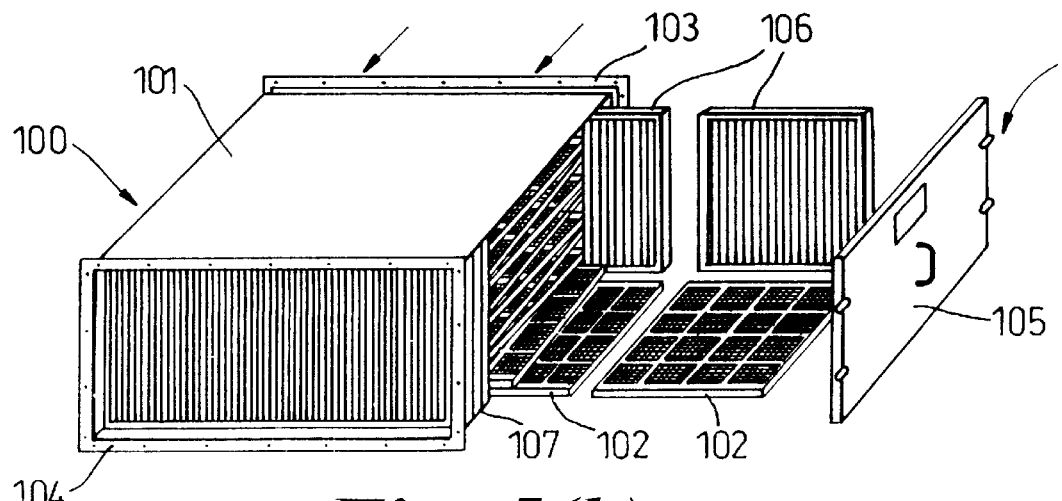

FIGS. 5(a) and 5(b) show two perspective views of a filter unit 100 adapted to use the filter panels in accordance with the present invention.

The filter units 100 comprise a rigid housing 101 of corrosion resistant material which supports a plurality of filter panel assemblies 102. In a first embodiment of the invention each filter panel 102 is substantially as described hereinbefore, and contains a chemisorption filter media such as impregnated activated alumina which is adapted to change color as an indication of its level of saturation with contaminants. The unit 100 has first and second opposed open-end faces 103, 104 to allow fluid to flow through the housing 101 and the filters 102. It also has an open side which is covered in use by a removable side panel 105. The filter panels can be inserted and removed through the open side. Pre-filter panels 106 and post filter panels 107 placed across the open-end faces 103, 104 are also provided. Because the filter panels 102 are a transparent material, it is possible to view the contents of the filter panels in situ, whilst the filter panels 107 are supported in the housing 101.

Figure 6:
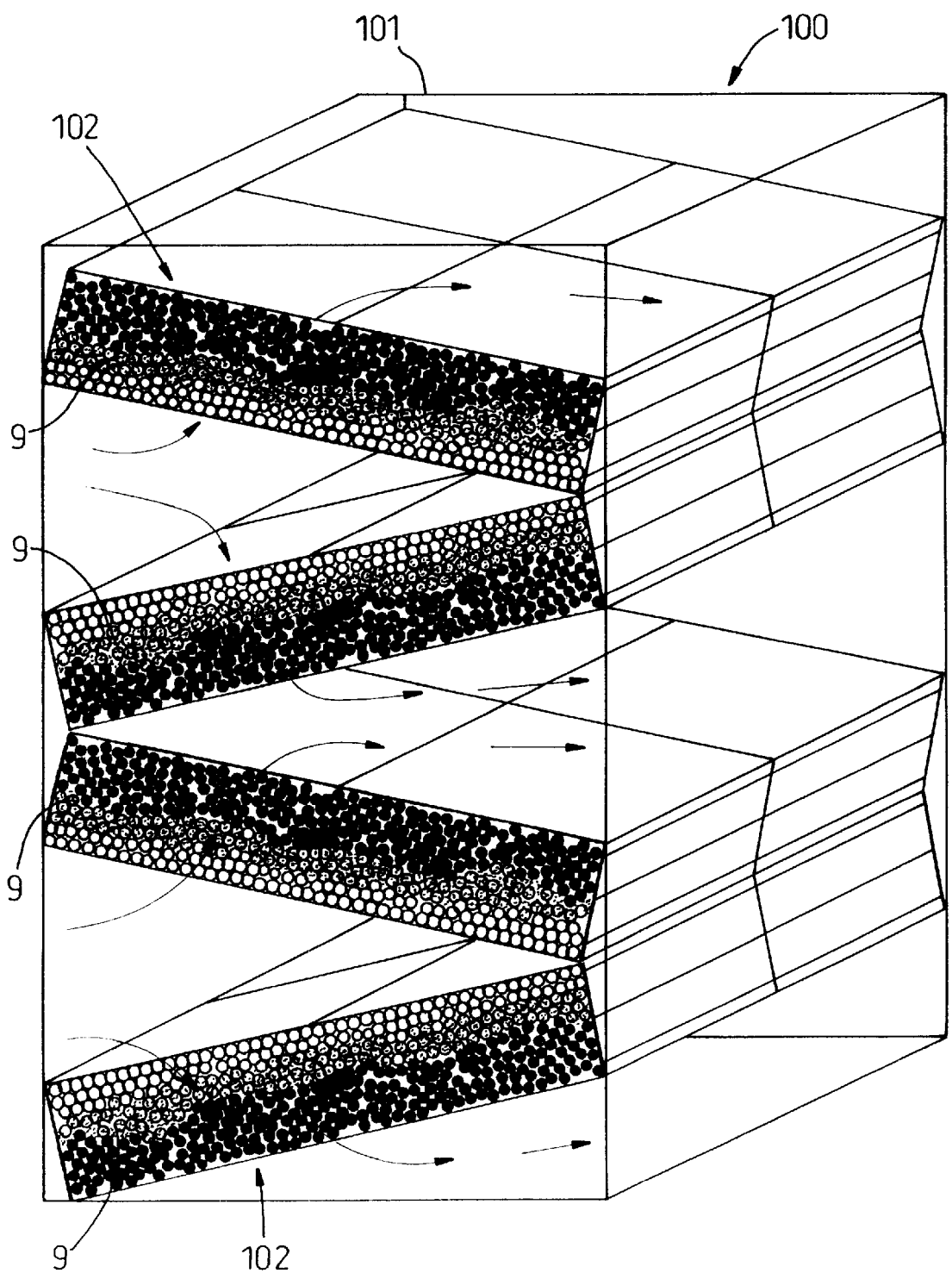
FIG. 6 shows the colour change induced in the filter media contained in the filter panels when installed in a filter unit, with the direction of air or gas flow indicated by arrows.

FIG. 6 shows, in cross section, the first embodiment of the invention with the color change in the filter media 9 within the filter panels 102 whilst within the housing 101. In the example shown, the filter media 9 changes from an initial dark color (such as purple) to a brighter shade of purple to dark brown to light brown to almost white as the media reaches the end of its useful life.

As the contaminated air passes through the small perforations in the filter panel, the air comes into contact with the filtering media 9. This causes a color change in the filter media 9 and generally results in a shading through the filter media 9. This shading can be easily observed through the filter panels in accordance with the present invention. Thus, it is not necessary to remove or dismantle the panels to observe the condition of the filtering media 9. This would not be possible with nontransparent filter panels.

Figure 7:
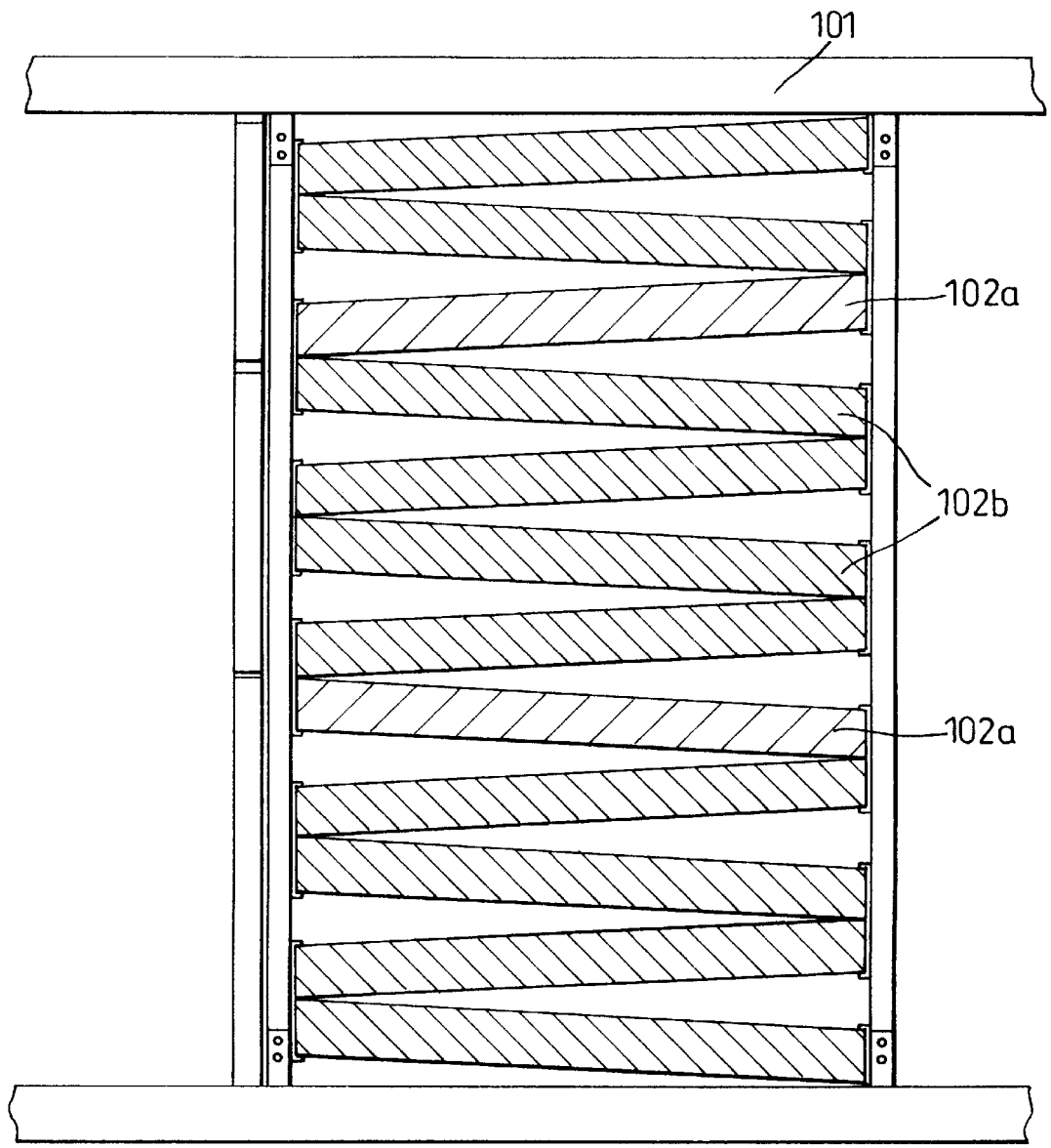
FIG. 7 shows one possible way of arranging filter panels in the housing.

FIG. 7 shows, in cross-section, a second embodiment of the present invention wherein the housing 101 supports a plurality of filter panels 102. A number of filter panels 102a, being less than the total number of filter panels (e.g. 2 as shown in FIG. 7), are substantially as described hereinbefore and contain a chemisorption filter media such as impregnated activated alumina that is adapted to change color on saturation. The remaining filter panels 102b contain a filter media which does not change color on saturation, for example activated carbon.

Figure 8:
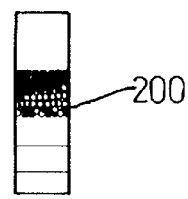
FIG. 8 shows a colour sample card.

FIG. 8 shows a sample 'swatch' card 200, upon which a selection of colors corresponding to various conditions of the filter media have been deposited. This can be used to quickly provide an indication of the remaining capacity of the filtering media.

I claim:

1. A filter panel for use in combination with a filter unit comprising a housing adapted to support one or more of said filter panel within a flow of air or gas through said housing, in which at least a portion of said panel is made from an optically transparent material, and said panel is adapted to house a filter material which changes color depending on its condition.

2. The filter panel according to claim 1 wherein said filter panel is made entirely of an optically transparent material.

3. The filter panel according to claim 1 wherein the said optically transparent material is a plastics material.

4. The filter panel according to claim 3 wherein said plastics material is polycarbonate.

5. The filter panel according to claim 3 wherein said plastics material is high impact styrene.

6. The filter panel according to claim 3 wherein said panel is formed by injection moulding.

7. The filter panel according to claim 1 wherein at least a portion of said filter media is adapted to change color as it becomes saturated.

8. The filter panel according to claim 7 wherein said filter media is a chemisorption material.

9. The filter panel according to claim 7 wherein said filter media comprises an impregnated activated alumina.

10. The filter panel according to claim 1 wherein more than one said filter panel is contained in said housing and wherein at least one of the said filter panels houses a filter media adapted to change color depending on its condition.

11. The filter panel according to claim 10 wherein said filter panels contained in the housing, not housing said filter media adapted to change color house an activated carbon filter media.

12. The filter panel according to claim 1 wherein said filter panels each comprise one or more filter cells.

13. The filter panel according to claim 12 wherein said filter cells are interlockable to allow an array of said cells to be assembled into panels of varying sizes.

14. The filter panel according to claim 12 wherein each of said filter cells comprises at least an upper perforated face and a lower perforated face supported in a spaced apart arrangement to define one or more compartments there between in which said filter media can be retained.

15. The filter panel according to claim 14 wherein said upper and said lower faces define a mesh.

16. The filter panel according to claim 15 wherein said faces are spaced apart by ribbing provided on one side of at least one of said faces integral with said mesh.

17. The filter panel according to claim 16 wherein ribbing is provided on said upper face which is complementary to ribbing on said lower face to define a plurality of compartments when said upper and lower faces are assembled together.

18. The filter panel according to claim 14 wherein said compartments of said filter cell are open-ended to allow movement of said filter media from one cell to another cell in a multi-cell filter panel.

19. The filter panel according to claim 18 further comprising a slide strip disposed across said open end between said upper and lower faces to close off said compartments.

20. The filter panel according to claim 14 further comprising a spacer frame disposed between said upper and lower faces.

21. The filter panel according to claim 16 further comprising a spacer frame disposed between said upper and lower faces and including portions complementary in shape to the ribbing on the said upper and lower faces.

22. The filter panel according to claim 20 wherein said spacer frame comprises an end strip which forms an end wall of said filter cell, first and second parallel side strips which extend from said end strip to define the side walls of said filter cell, and one or more partition strips which extend from said end strip between the two side strips which act as baffles to define one or more cavities.

23. The filter panel according to claim 20 wherein the spacer frame is at least partially transparent.

24. The filter panel according to claim 19 wherein the slide strip is at least partially transparent.

25. A method of monitoring the condition of a filter media in a filter unit, said filter unit comprising a housing adapted to support one or more filter panels disposed therein, said method comprising the steps of:

providing a filter panel having at least a first transparent portion which contains a filter media which is adapted to provide a visual indication of the condition of the filter media; and monitoring the condition of the filter media by viewing the media through the transparent portion of the filter panel.

26. The method according to claim 25 wherein the method further comprises comparing said filter media to a predetermined color on a color swatch.

27. The method according to claim 25 wherein said color swatch is calibrated.

28. The filter panel according to claim 21 wherein said spacer frame comprises an end strip which forms an end wall of said filter cell, first and second parallel side strips which extend from said end strip to define the side walls of said filter cell, and one or more partition strips which extend from said end strip between the two side strips which act as baffles to define one or more cavities.

29. The filter panel according to claim 21 wherein the spacer frame is at least partially transparent.

* * * * *